United States Patent
Lathrop et al.

(10) Patent No.: US 9,459,678 B2
(45) Date of Patent: Oct. 4, 2016

(54) POWER MANAGER FOR VIRTUAL MACHINES

(75) Inventors: Frederick L Lathrop, Spring, TX (US); Eric Owhadi, Tomball, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 860 days.

(21) Appl. No.: 12/361,614

(22) Filed: Jan. 29, 2009

(65) Prior Publication Data

US 2010/0192149 A1 Jul. 29, 2010

(51) Int. Cl.
*G06F 1/32* (2006.01)
*G06F 9/455* (2006.01)

(52) U.S. Cl.
CPC ............ *G06F 1/3203* (2013.01); *G06F 1/329* (2013.01); *Y02B 60/144* (2013.01)

(58) Field of Classification Search
None
See application file for complete search history.

(56) References Cited

U.S. PATENT DOCUMENTS

| | | | |
|---|---|---|---|
| 5,590,342 A | 12/1996 | Marisetty | |
| 5,845,138 A | 12/1998 | Nowlin, Jr. | |
| 7,225,441 B2 | 5/2007 | Kozuch | |
| 7,861,102 B1* | 12/2010 | Ranganathan et al. | 713/300 |
| 2002/0083110 A1* | 6/2002 | Kozuch et al. | 709/1 |
| 2002/0099753 A1* | 7/2002 | Hardin et al. | 709/1 |
| 2002/0138774 A1* | 9/2002 | Imada et al. | 713/300 |
| 2005/0268078 A1 | 12/2005 | Zimmer et al. | |
| 2006/0005184 A1* | 1/2006 | Tewari et al. | 718/1 |
| 2007/0112999 A1 | 5/2007 | Oney et al. | |
| 2007/0192641 A1* | 8/2007 | Nagendra et al. | 713/320 |
| 2007/0300218 A1* | 12/2007 | Mann | G06F 9/4418 718/1 |
| 2008/0104608 A1* | 5/2008 | Hyser et al. | 718/105 |
| 2009/0240963 A1* | 9/2009 | Zimmer et al. | 713/310 |
| 2010/0037038 A1* | 2/2010 | Bieswanger et al. | 712/220 |

OTHER PUBLICATIONS

Ripal Nathuji, Karsten Schwan, VirtualPower: coordinated power management in virtualized enterprise systems, Proceedings of twenty-first ACM SIGOPS symposium on Operating systems principles, Oct. 14-17, 2007, Stevenson, Washington, USA.*

* cited by examiner

*Primary Examiner* — Eric C Wai

(74) *Attorney, Agent, or Firm* — Trop, Pruner & Hu

(57) ABSTRACT

A virtual power manager provides for, when plural virtual machines are running, accessing these virtual machines to determine their respective virtual-machine power settings and determining hardware power settings at least in part as an aggregate function of the virtual-machine power settings.

17 Claims, 3 Drawing Sheets

POWER MANAGER FOR VIRTUAL MACHINES

BACKGROUND

Computer systems employ power management for several reasons. Laptop computers and other mobile computers typically employ power management to extend battery life. Desktop and larger computer systems employ power management to reduce energy costs and to promote energy conservation. Enterprise computer installations sometimes must employ power management to maintain power consumption within the limits imposed by electrical utilities and power delivery infrastructure. In addition, power management may be used to limit heat dissipation so that computers do not overheat or impose an undue burden on heat-removal facilities.

Power management can be automated or implemented manually. For example, power management can involve a user shutting down a computer during long periods of non-use, or a computer automatically shutting down or entering a low-power state after a predetermined period of inactivity. Some power management schemes involve both user input and automated activity. For example, a software shutdown proceeds through a series of steps to preserve data before cutting off power to computer components. For another example, the criteria according to which a computer shuts down or changes a low-power state are often user selectable.

DETAILED DESCRIPTION

Figure 1:
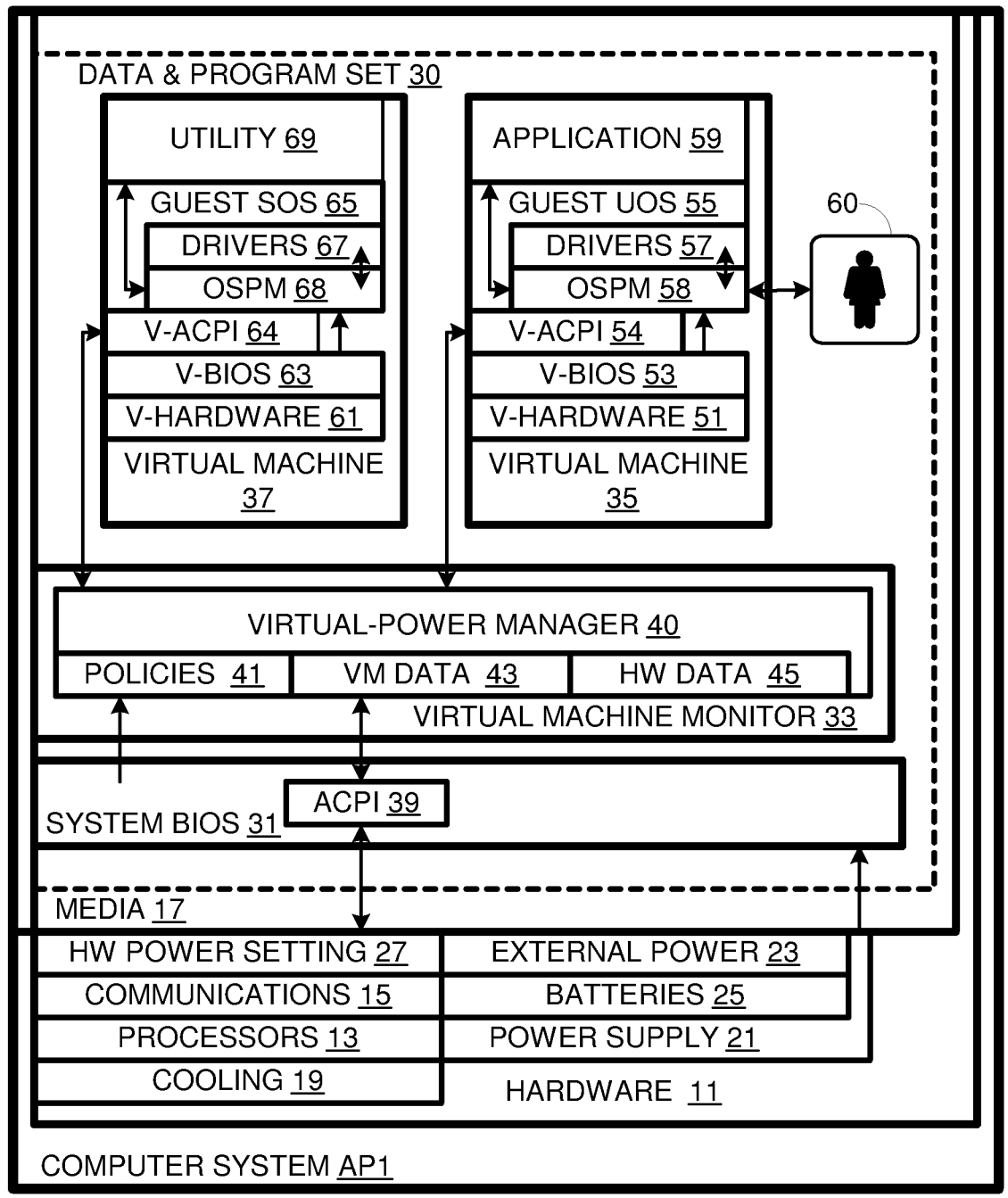
FIG. 1 is a schematic diagram of a computer system in accordance with an embodiment of the invention.

The inventors have recognized that power management and user interaction with a computer are deeply intertwined. If power management breaks down or behaves inconsistently, then normal end-user interactions and expectations get disrupted and the valued reliability and usefulness of the computer declines. Such a breakdown can occur when conventional power management schemes are employed in a virtual-machine environment.

A virtual machine is a software container that appears as though it were hardware to an operating system running in the container. Thus, when the operating-system-guided shutdown sequence is triggered, the end result is that the virtual machine is shut down, but not the underlying hardware. This may be a desirable result where other virtual machines on the same hardware need to remain active. However, the expectation of reduced power consumption due to a shutdown is not met. More generally, there are many other scenarios in which user expectations are not met.

An embodiment of the invention provides a virtual power manager that manages power-related interactions between virtual machines and the hardware they run on. This virtual power manager can be included in a virtual-machine monitor. Two major variants are provided for. In a "hosted" environment, e.g., as in Parallels Workstation and VMware Workstation, the virtual-machine monitor runs within a host operating system as an application. In a "hypervisor" environment, e.g., XenDesktop and Microsoft Veridian, the virtual machine monitor runs as a software layer underneath all the virtual machines and just above the BIOS and physical hardware.

In some embodiments of the invention, a virtual power manager gathers power-state data (e.g., regarding states such as "on" (S0), "sleep" (S3), "hibernate" (S4), "off" (S5), device power-versus-performance states P1, D1, etc.) from the virtual machines and then controls hardware power states (directly or indirectly) as an aggregate function of these power states. For example, if all virtual machines are shutdown, the virtual power manager can command the hardware to shut down.

In some embodiments of the invention, a virtual power manager manages virtual-machine power states as a function of power states of other virtual machines. For example, the virtual power manager can shut down a first virtual machine when the only function of the first virtual machine is to service a second virtual machine and that second virtual machine has been shut down.

In some embodiments of the invention, a virtual power manager gathers hardware power state and utilization data for use by one or more virtual machines. For example, the virtual power manager can provide battery time remaining data to a virtual machine for viewing by a user. The user can then make power-related decisions based on battery time remaining.

Advantages of virtual power management over prior art from an architecture perspective include: (a) the simplified predictable control model which scales across any number of virtual machines regardless of installed operating systems and applications, (b) the ability to allow serialized access of dedicated hardware usage across multiple environments using standard power management interfaces and events and (c) easy reflection of real hardware capabilities into virtual machines via industry standard power management interfaces (e.g., ACPI).

Advantages of virtual power management over prior art from an end-user perspective include: (a) the ability to control both virtual machine states and the physical computer state either independently (power off a virtual machine) or seamlessly (power up/down computer and virtual machines by pressing power button), (b) the ability to gain full hardware performance (hardware graphics acceleration) on demand, and (c) the accurate consistent view of the real physical hardware status (e.g., battery power) across virtual machines. Other features and advantages are apparent from the figures and related description below.

In accordance with an embodiment of the invention, a computer system AP1 includes hardware 11, as shown in FIG. 1. Computer system AP1 is a desktop-replacement laptop computer, although other laptop, desktop, workstation, mobile, and enterprise computer systems are provided for by other embodiments of the invention. Hardware 11 includes processors 13, communications devices 15, computer-readable storage media 17, cooling devices 19, and a power supply system 21. Power supply system 21 provides for both external power 23 (e.g., via an external AC adapter), and batteries 2 5. These hardware components can have associated power settings 27.

Media 17 includes disk-based memory and solid-state memory having encoded thereon a data and a program set 30. Set 30 includes a system BIOS (basic input-output system) 31, a virtual-machine monitor 33, and virtual machines 35 and 37. Some embodiments of the invention provide in general for any number of virtual machines. System BIOS 31 provides an Advanced Configuration and Power Interface (ACPI) 39. ACPI is an open-standard for unified OS-centric device configuration and power management. ACPI 39 defines various power states that devices can assume. In an alternative embodiment, a hardware ACPI controller cooperates with tables in ACPI firmware to provide for power management. ACPI 39 provides the tables and emulates a controller in firmware to achieve similar functionality.

Virtual-machine monitor 33 includes a virtual-power manager 40, as well as associated power management policies 51, virtual machine data 43 including data describing virtual-machine power settings, and hardware data 45 including data describing hardware settings and utilization. Policies 51 define how hardware settings 27 and virtual machine settings are to be determined from virtual-machine data 43. In general, the determinations are made using aggregate functions, i.e., functions that are not generally reducible to functions of data from a single virtual machine. (An aggregate function may be reducible in a situation where only one virtual machine is involved.)

Virtual machine 35 defines virtual hardware 51, a virtual BIOS 53 with an associated virtual ACPI 44. Running on virtual machine 35 is a guest user operating system (UOS) 55, which provides hardware drivers 57 and an operating system power manager (OSPM) 58. A user application 59 runs on operating system 55. A user 60 can interact with application 59 or OSPM 58.

Virtual machine 37 defines virtual hardware 61, a virtual BIOS 63 with an associated virtual ACPI 64. Running on virtual machine 37 is a guest service operating (SOS) system 65, which provides hardware drivers 67 and an OSPM 68. A service utility 69 runs on operating system 65. It should be emphasized that some embodiments of the invention provide for any number of virtual machines, any, all, or some of which can run user applications or utilities.

Policies 41 can differentiate between service and user operating systems. For example, one policy can be that power management initiated by a service operating system, e.g., 65, affect only resources owned by its virtual machine, e.g., virtual machine 37, while power management initiated by a user operating system, e.g., user operating system 55, affect the entire computer, e.g., computer AP1.

Figure 2:
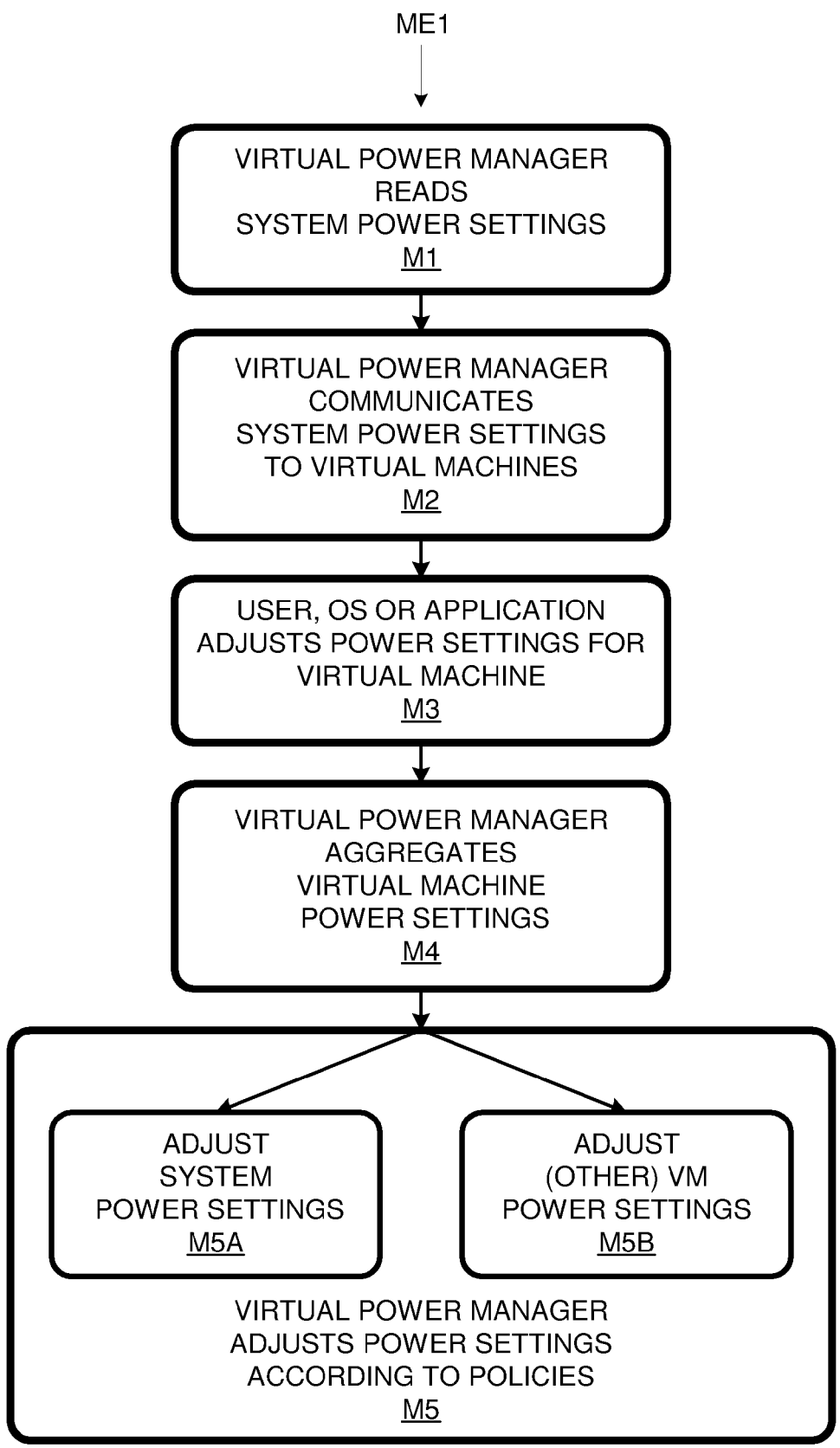
FIG. 2 is a flow chart of an embodiment of a virtual-power management method.

A power-management method ME that can be practiced in the context of computer system AP1 is flow charted in FIG. 2. At step M1, virtual power manager 40 reads system hardware power settings 27 from ACPI 39. In addition, hardware utilization data can be obtained at step M1. The power settings and utilization data (including battery time remaining data) can be stored by virtual-power manager 40 as hardware data 45.

At step M2, virtual power manager 40 communicates at least some of hardware data 45 to V-ACPI 54 of virtual machine 35, whence it is accessible to OSPM 58. User 60 can then access the hardware (e.g. battery) data via OSPM 58.

At step M3, the power settings for virtual machine 35 are adjusted, e.g., via V-ACPI 54. The adjustment can be controlled by user 60 or be implemented automatically, e.g., in response to a keyboard timeout. The adjustment can be in response to data received at step M2, or be an independent event, such as a VM shutdown by a user getting ready to leave for lunch.

At step M4, virtual power manager 40 aggregates the power states of virtual machines 35 and 37. In one scenario, virtual machine 35 is shut down, while 37 remains active. At step M5, virtual power manager 40 adjusts the power settings of either hardware 11 via ACPI 39 (at step M5A) or another virtual machine, e.g., virtual machine 37 (at step M5B), or both via respective V-ACPIs 54, 64 and OSPMs 58, 68. Note that there is no need for the guest operating systems to be "enlightened" regarding the presence of virtual power manager 40. Some scenarios for method ME are described below.

Scenario 1

Virtual power manager 40 gathers power state data from virtual machines 35 and 37. Virtual power manager 40 checks policies 41. A first policy dictates that if any one virtual machine is on, computer system AP1 should remain on. However, a second policy dictates that if virtual machine 35 is shut down, virtual machine 37 should be shut down. Virtual power manager 40 shuts down virtual machine 3 7. Then the first policy dictates that hardware 11 should be shut down. If the second policy was not to shut down virtual machine 37 when virtual machine 35 is shutdown, then the second policy will leave hardware 11 on.

Scenario 2

While computer system AP1 is running on batteries 25, user 60 requests OSPM 58 for battery time remaining. The request is communicated through V-ACPI 54 to virtual power manager 40, which obtains the information from ACPI 39 and returns it through V-ACPI 54 to OSPM 58.

Note that prior-art virtual-machine environments often present a lowest common denominator representation of hardware to virtual machines. In such environments, battery operation is typically not recognized. Some embodiments of the invention provide a practical approach to overcoming such limitations.

Scenario 3

User 60 turns on one or more wireless radios (WiFi, Bluetooth, WWAN) of communications devices 15 by moving a switch on the exterior of computer system AP1. Initially, virtual machines are unaware of this change. Hardware 11 sends a system management interrupt (SMI) to system BIOS 31 which 1) turns on power to the affected wireless device(s). The physical device power state change invokes a Plug and Play (PnP) hardware bus event and device re-enumeration is initiated on the bus, e.g., Universal Serial Bus (USB). The physical PnP event is reflected into the respective virtual machines as virtual PnP device node enumerations which leads to the recognition of the newly activated radio by the guest operating system.

2) sends a system control interrupt (SCI) to virtual power manager 40 for the Wireless button state change status. Virtual power manager 40 notifies V-ACPI 54, which sends a virtual SCI to OSPM 58. OSPM 58 queries V-ACPI 54 methods and determines a Windows Management Interface Event has occurred. V-ACPI 54 notifies WMI Providers of the event via standard operating-system protocols.

Scenario 4

User launches a video game or other resource intensive program in a first virtual machine. The virtual power manager detects this launch based upon the application's request for graphics hardware acceleration support. A policy dictates that a second virtual machine be placed in sleep mode to release resources to the first virtual machine. In an extension of this scenario, a virtual power manager can selectively impose sleep states on some virtual machines to make resources, e.g., a graphic card, more available to others. This can be done of a rotating basis where required.

Some embodiments of the invention provide for preserving the following expected computer-user behaviors.

1) When the user presses the computer hardware (HW) sleep button...
   If currently On, then the computer goes to sleep
2) When the user presses the computer hardware power button...
   If currently Off, then the computer powers on & boots OS
   If currently On, then the OS shuts down and computer powers off
3) When the user presses and holds the computer hardware power button down (>5 s)...
   If currently On, then the computer powers off (no OS shutdown)
4) When the computer battery runs low...
   OS displays low battery warning to user
5) When the computer battery runs critically low
   OS displays warning to user and hibernates computer
6) When the user has been away from the computer for a while...
   display blanks, hard disk drive spins down, and OS transitions system to sleep state
7) When the user has been away from the computer for a long while...
   OS transitions system sleep state to hibernation state Some embodiments of the invention also provide for preserving the following user-to-OS behaviors.
1) When the user presses the OS software (SW) sleep button
   OS transitions to sleep state
2) When the user presses the OS (SW) power ("Turn Off Computer") button...
   If Turn Off selected then OS shuts down
   If Restart selected then OS shuts down and OS reboots
3) When the OS hard-disk drive (HDD) timer expires...
   OS spins down HDD
   HDD activity causes OS timer reset
4) When the OS Display Blank Timer expires...
   OS blanks display
   Keyboard/Mouse (User) activity causes OS timer reset
5) When the OS Sleep Timer expires...
   OS tells apps/drivers to sleep then transitions to sleep state
   User and/or application activity causes OS timer reset
6) When the OS Hibernation Timer expires
   OS tells apps/drivers to hibernate then transitions to hibernation state
   User and/or application activity causes OS timer reset
7) When the user has been away from the OS for a while (see #s 3-5)...
8) When the user has been away from the OS for a long while (see #6)...

Figure 3:
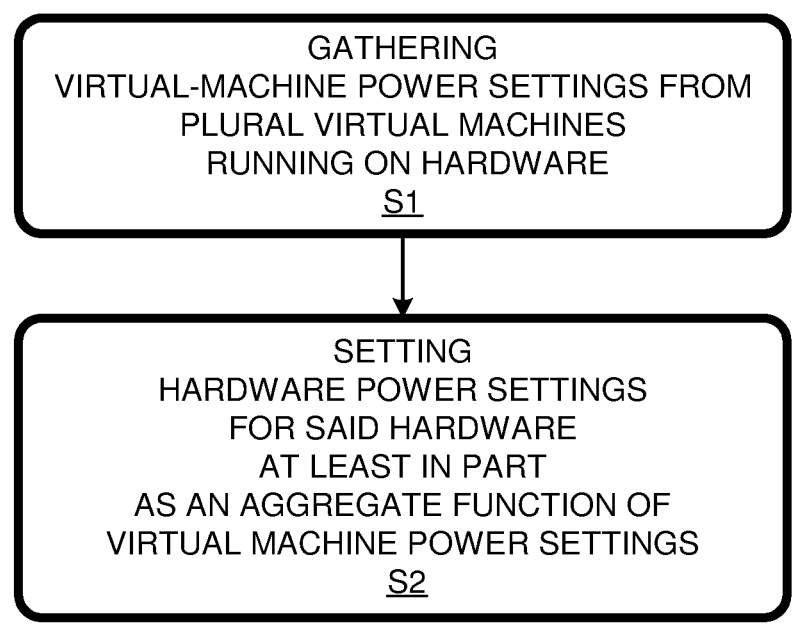
FIG. 3 is a flow chart of an embodiment of an alternative virtual-power management method.

FIG. 3 illustrates an embodiment of a virtual power-management method ME2. Method segment S1 provides for gathering virtual-machine power settings from plural virtual machines running on hardware. Method segment S2 provides for setting hardware power settings for said hardware at least in part as an aggregate function of the virtual-machine power settings.

A "computer system" is a system that manipulates data encoded in computer-readable storage media in accordance with instructions encoded in computer-readable storage media. Hardware includes physical components of a computer system. Herein "hardware" includes firmware and media in which computer instructions and data are encoded. From one perspective an "instruction" is a special type of data; from another perspective, "instruction" and "data" are mutually exclusive terms. Herein, the latter perspective is adopted except where the contrary is apparent from context. A virtual machine is a program or set of programs on which an operating system can run.

"Power settings" refers to power-related states, including such states are defined by the "advances power control interface" or ACPI standard. These states include power off, sleep, hibernate, on, and various power versus performance states, e.g., P-states. Hardware settings are settings for computer hardware. Virtual-machine power settings relate to power-related virtual machine states. Operating systems and applications are often unaware that they are running on a virtual machine instead of computer hardware; when such operating systems and applications attempt to adjust hardware power settings, the settings entered by a virtual machine in response to these attempts are considered virtual-machine power settings.

Herein, an aggregate function is a function for which the output is dependent on data from plural sources (e.g., virtual machines) and is not generally reducible to data from any one of the sources.

Hardware utilization data includes actual power consumption data and device (e.g., processor) utilization data. Herein, a "policy" is user selectable data encoded on computer-readable storage media that determines functions according to which outputs are determined from inputs. Here, "user selectable" does not preclude default values.

Herein, related art is described to facilitate understanding. Related art labeled "prior art" is admitted prior art; related art not labeled "prior art" is not admitted prior art. While FIG. 1 depicts two virtual machines, some embodiments of the invention scales readily to larger numbers of virtual machines. Both hosted and hypervisor environments are provided for. These and other variations upon and modifications to the illustrated embodiment are provided by the present invention, the scope of which is defined by the following claims.

What is claimed is:

1. A method comprising:
   detecting, by a virtual power manager executing on a computer system, a launch of a software application on a first virtual machine, wherein the first virtual machine is executing on the computer system;
   in response to the launch of the software application on the first virtual machine:
      determining, by the virtual power manager, a first requirement of the software application for a first hardware resource of the computer system; and
      adjusting, by the virtual power manager, a power setting of a second virtual machine based on the first requirement of the software application on the first virtual machine, wherein the power setting is a sleep mode of the second virtual machine.

2. The method of claim 1, wherein adjusting the power setting of the second virtual machine comprises switching the second virtual machine from a relatively high power state to a relatively low non-off power state.

3. The method of claim 1, wherein the software application is a video game application.

4. The method of claim 3, wherein the first hardware resource of the computer system is a graphics card.

5. The method of claim 1, further comprising:
   adjusting, by the virtual power manager, a power setting of a third virtual machine based on the first requirement of the software application on the first virtual machine.

6. The method of claim 5, wherein the power settings of the second virtual machine and the third virtual machine are imposed on a rotating basis.

7. The method of claim 1, wherein the second virtual machine comprises virtual power-versus-performance states including an OFF state, a relatively high power state, and a relatively low non-off power state.

8. A computing device comprising:
a hardware processor; and
a machine-readable storage medium storing instructions, the instructions executable by the hardware processor to:
  execute a first virtual machine and a second virtual machine;
  detect a launch of a software application on the first virtual machine;
  in response to the launch of the software application on the first virtual machine:
    determine a first requirement of the software application for a first hardware resource of the computer device; and
    adjust a power setting of the second virtual machine based on the first requirement of the software application on the first virtual machine, wherein the power setting is a sleep mode of the second virtual machine.

9. The computing device of claim 8, the instructions further executable by the hardware processor to:
switch the second virtual machine from a relatively high power state to a relatively low non-off power state.

10. The computing device of claim 8, wherein the software application is a video game application.

11. The computing device of claim 10, wherein the first hardware resource is a graphics card.

12. The computing device of claim 8, the instructions further executable by the hardware processor to:
  adjust a power setting of a third virtual machine based on the first requirement of the software application on the first virtual machine.

13. The computing device of claim 12, wherein the power settings of the second virtual machine and the third virtual machine are imposed on a rotating basis.

14. An article comprising a non-transitory machine-readable storage medium storing instructions that upon execution cause a processor of a computer system to:
  execute a first virtual machine and a second virtual machine;
  detect a launch of a software application on the first virtual machine;
  in response to the launch of the software application on the first virtual machine:
    determine a first requirement of the software application for a first hardware resource of the computer system; and
    adjust a power setting of the second virtual machine based on the first requirement of the software application on the first virtual machine, wherein the power setting is a sleep mode of the second virtual machine.

15. The article of claim 14, the instructions further executable by the processor to:
  adjust the power setting of the second virtual machine by switching the second virtual machine from a relatively high power state to a relatively low non-off power state.

16. The article of claim 14, wherein the software application is a video game application.

17. The article of claim 16, wherein the first hardware resource is a graphics card.

* * * * *